356-153
1/23/79    XR    SR    4,135,823

United States Patent [19]
Hörvallius

[11] 4,135,823
[45] Jan. 23, 1979

[54] OPTICAL ASSEMBLY FOR GENERATING LIGHT BEAMS ACCURATELY AT RIGHT-ANGLES TO EACH OTHER

[75] Inventor: Torgny W. Hörvallius, Gavle, Sweden

[73] Assignee: Aktiebolaget SAMEFA, Stockholm, Sweden

[21] Appl. No.: 707,473

[22] Filed: Jul. 20, 1976

[30] Foreign Application Priority Data

Jul. 25, 1975 [SE] Sweden ..................... 7508469

[51] Int. Cl.² .............................................. G01C 1/00
[52] U.S. Cl. .................... 356/148; 356/153; 356/155; 356/247; 356/249
[58] Field of Search ................ 356/106 R, 148, 153, 356/155, 247, 249, 150, 154, 172; 350/169

[56] References Cited
U.S. PATENT DOCUMENTS

| 2,937,560 | 5/1960 | Mades et al. | 356/150 X |
| 3,563,633 | 2/1971 | Mauer | 356/106 R X |

FOREIGN PATENT DOCUMENTS 569118  5/1945  United Kingdom.

*Primary Examiner*—John K. Corbin
*Assistant Examiner*—Matthew W. Koren
*Attorney, Agent, or Firm*—Blanchard, Flynn, Thiel, Boutell & Tanis

[57] ABSTRACT

An optical assembly is provided which comprises a light source, preferably a laser, and a particularly compensated prism unit, the laser and the prism unit being mounted on a common holder or base. The beam emitted from the laser is reflected 90° by the prism unit, and although this unit is only approximately aligned with the laser the reflected beam will always form a right angle to the incident beam with an extreme accuracy, the deviation from 90° being less than half an angular minute. The accuracy in reflexion independently of prism unit setting is attributed to the compensated prism unit, which comprises a quadrangular prism composed of two semi-quadrangular prisms, a reflecting surface being mounted, preferably in an adjustable position, adjacent one side of the prism.

7 Claims, 11 Drawing Figures

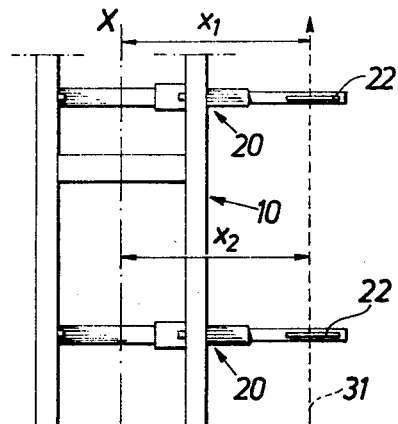
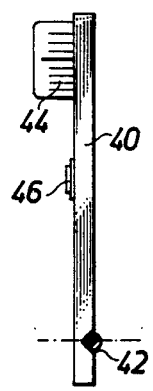
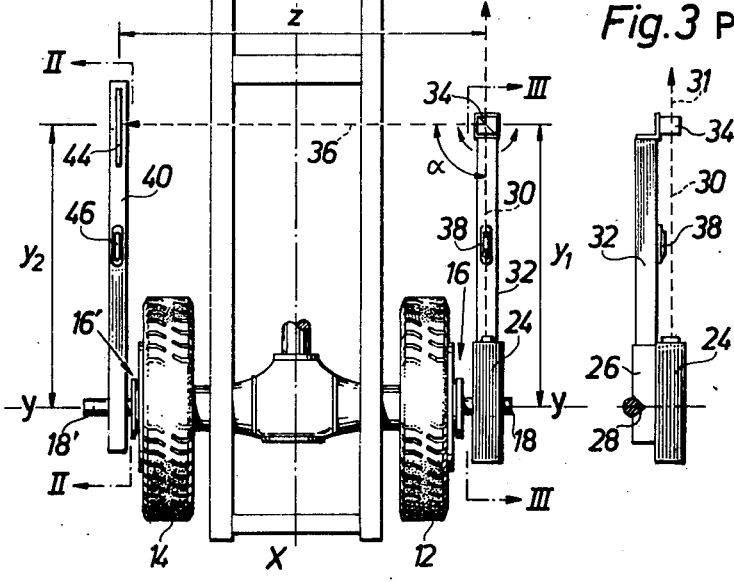
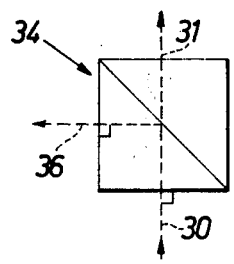
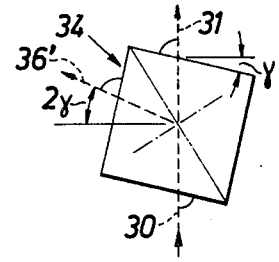

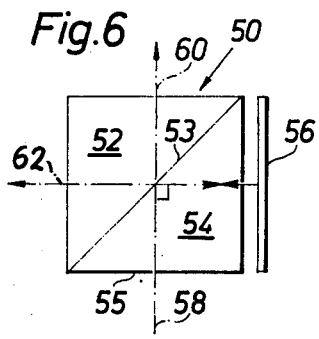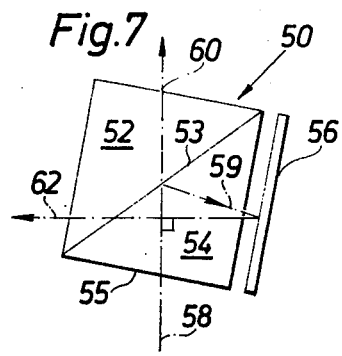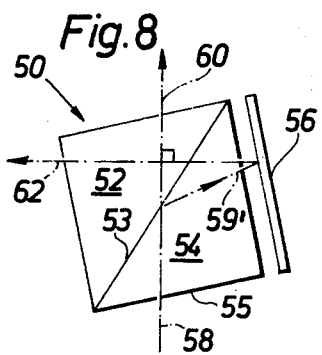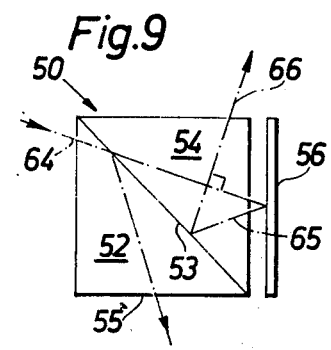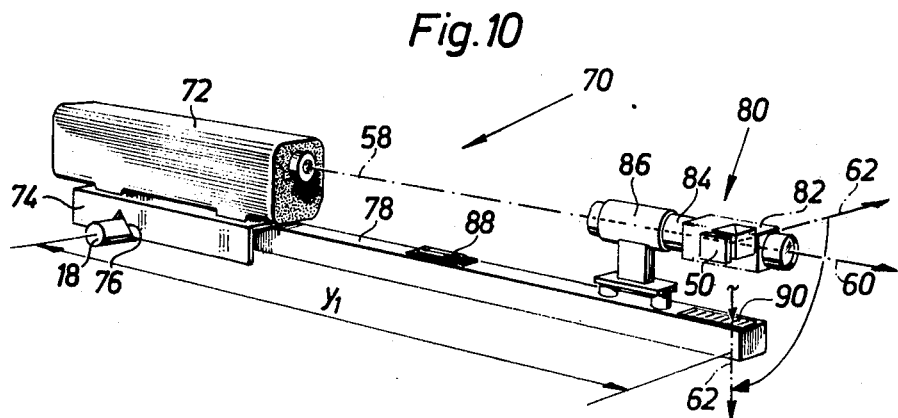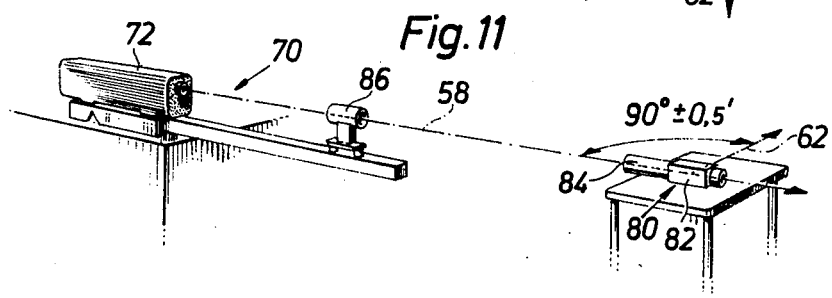

OPTICAL ASSEMBLY FOR GENERATING LIGHT BEAMS ACCURATELY AT RIGHT-ANGLES TO EACH OTHER

The present invention relates to an optical assembly for generating light beams accurately at right angles to each other, said assembly including an optical prism with a special device for compensating adjustment and-/or angular error of the prism. The latter consists preferably of a quadrangular prism composed of two semi-quadrangular prisms arranged to deviate or reflect, from a light beam incident on the composite prism and preferably completely let through by the prism, a partial beam at right angles to this incident or through-passing beam. In the optical assembly according to the invention there is incorporated a suitable radiating source, preferably a laser, and by means of said compensating device it is ensured that the partial beam is always deviated exactly 90° with such accuracy that the deviation from this value falls below half an angular minute.

In angular measurements, e.g. for checking frameworks such as vehicle chassis and the wheel axles mounted therein, but also building constructions and the like, optical prisms are often used in combination with a light source which generates a narrow intensive light beam, the modern lasers being especially suitable for the purpose. The prism is thereby usually so arranged that an incident light beam is allowed to pass straight through the prism without appreciable refraction, while a portion of the beam is simultaneously reflected against one or more surfaces in the prism, leaving it at right angles to the incident beam. An ordinary prism construction is the quadrangular one indicated above, i.e. the prism composed of two semi-quadrangular prisms united along their hypotenuse surfaces, which thus form a diagonal surface in the composite quadrangular prism. A light beam which is incident at right angles to one of the sides of the prism will partly pass straight through the prism, partly be reflected in the diagonal uniting surface, the reflected part of the beam leaving the prism at an angle of 90° to the incident/refracted beam.

Prisms of this kind can be troubled with minor angular errors per se, and they can also be incorrectly adjusted in assembly or use. A minor such angular or adjustment error does not appreciably affect the ray passing straight through the composite prism, but on the other hand, the error will affect the reflected beam to a high degree. Even the most insignificant disturbance, e.g. in the positional adjustment of the prism, causes a deviation from the right angle between the incident and reflected beam which gives unacceptable errors in measurement.

The invention therefore has the object of providing an optical assembly comprising a light source and a prism unit fitted with a compensating device in which the prism, thanks to the compensating device, is capable of deviating or reflecting a beam, emitted from the light source, incident on the prism unit and preferably coaxially refracted thereby to form an exact right-angle with the incident beam, having such an accuracy that the deviation from 90° falls below half an angular minute.

The invention will now be described in detail for the purpose of exemplification while referring to the attached drawings, in which FIG. 1 schematically shows the rear portion of a wheeled vehicle chassis and illustrates how different check measurements of the chassis and wheel axles can be carried out according to known technique.

FIGS. 2 and 3 are detailed views of apparatuses used for the measurements seen from the planes indicated by the lines II—II and III—III.

FIGS. 4 and 5 show schematically a known double prism which can be used for the measurements, the figures showing the prism in two different positions.

FIG. 6 shows a double prism provided with a compensating device according to the invention, and FIGS. 7 and 8 illustrate how this device functions in different positions of the prism.

FIG. 9 shows the ray construction in a further method of using the compensated prism according to the invention.

FIG. 10 is a perspective view of the entire optical assembly according to the invention, and FIG. 11 finally shows how the assembly according to FIG. 10 can be taken apart and used with retained accuracy.

In order to clarify the background of the invention, there is shown in FIG. 1 the rear portion of a vehicle chassis comprising a frame 10 with a central axis X—X, there also being schematically indicated left and right rear wheels 14 and 12, respectively, with rotational axis Y—Y. It is assumed that the straightness of the frame shall be checked and also its position in relation to the rotational axes of both rear wheels and the coaxiality of the wheel axes.

Removable centering means 16 and 16' are mounted on both rear wheels 12 and 14 for the measurements, said means being provided with projecting pins 18 and 18' and being so arranged that the pins can be brought into exact coaxiality with the rotational axis of the respective wheel by a simple adjustment. A suitable centering means of this kind is known in the art.

At suitable places along the vehicle frame 10, measuring bars 20 are mounted which are so constructed that by means of a scale, sighting pin or the like, they indicate a point which is at a definite distance x from the central axis X—X of the frame, independent of where the measuring bar is placed along the frame. A simple and effective measuring bar for the purpose is known in the art.

A ray emitter 24 is now applied to the centering pin 18 of one rear wheel, e.g. the right rear wheel 12. The ray emitter is preferably a laser, giving off a collected sharply restricted beam. The emitter is mounted on a foot 26 provided with a suitable guide 28, allowing the emitter 24 to be placed on the pin 18 so that its emitted beam 30 will be exactly at right angles to the axis of the pin. The foot 26 is connected to a base, e.g. in the shape of a bar 32 carrying at its other end a double prism 34 of the kind described in the introduction, the prism being arranged to receive the beam 30 centrally from the ray emitter 24, to divide the ray up in a known way into a beam 31 passing straight through the prism and a deviated or reflected beam 36 at right angles to the incident beam 30.

A measuring bar 40 is arranged in coaction with the centering pin 18' mounted on the left rear wheel 14, see FIG. 2, to engage with the pin by means of a guide 42, similar to the guide 28 in the ray emitter foot 26, so that the measuring bar 40 extends at right angles to the central axis of the pin 18' and thereby with that of the left rear wheel 14. A scale 44 is arranged at the opposite end of the measuring bar 40 and is intended to be impinged on by the beam 36 deviated from the prism 34, as shown in FIG. 1. Both the bar 32 of the ray emitter and the measuring bar 40 are preferably provided with an inclination indicator or level 38 and 46, respectively, with whose help the ray emitter 24 can be caused to emit a horizontal beam 30, 31 simultaneously as the measuring bar 40 is kept in a horizontal position which is thus parallel to the beam.

Under the conditions given above a series of check measurements can be carried out. The beam 36, deviated or reflected from the prism 34 at right angles to the beam 30, impinges on the scale of the measuring bar 40 at a point a distance $y_2$ from the central axis of the left wheel 14, and the beam 36 starts out itself from the prism 34 at a distance $y_1$ from the central axis of the right wheel 12. By comparing the measurements $y_1$ and $y_2$ it is evident that the coaxiality of the wheels can be checked, i.e. that the axis Y—Y is common to both, whereat the measurement is preferably carried out in other positions as well about the pins 18 and 18', e.g. with the measuring bar 40 and the ray emitter 24 pointing directly upwards, or in general in such positions where the view is free between the prism 34 and the scale 44 of the measuring bar 40.

With regard to straightening the frame 10, possible skew can be established by the through-passing ray emitter beam 30, 31, parallel with the frame, indicating points on the scale 22 of the different measuring bars 20 arranged along the frame. The measuring bars have such a construction, as mentioned, that the distance $x_1$, $x_2$ etc. from the indicating point of the beam 31 on the scales 22 to the central axis X—X of the vehicle frame can be observed and compared. Possible skew or deformations in the frame will be reflected in varying values for the measurement x.

To achieve the greatest possible accuracy, the components used for the different measurements must naturally be made with good precision, and in practice it has been found that without great difficulty or costly measures it is possible to provide means, e.g. correctly placed scales, guides 28 and 42 for the ray emitter foot 26 and the measuring bar 40, respectively, etc. with sufficient precision for their alignment to be satisfactorily accurate. There is, however, an extremely critical point in the system, namely the adjustment of the double prism 34 (which can in principle be replaced by a sloping, half transparent mirror) so that the reflection or deviation angle $\alpha$ will be exactly 90°. In actual fact the demands for accuracy in the adjustment of the prism are so great that they are practically impossible to meet, at least so that an initially exact adjustment will be lasting. In FIG. 4 the prism 34 is schematically shown in such a position that the reflected ray 36 will be exactly normal to the incident ray 30. It may subsequently be seen from FIG. 5 that if the prism is disturbed somewhat, e.g. so that it is turned an angle $\gamma$ about an axis at right angles to the plane of the drawing, the deviation from 90° of the reflected ray 36' will be double this "angle of disturbance", i.e. 2 $\gamma$. If it is assumed that the distance z, see FIG. 1, from the beam 30, 31 coming from the ray emitter to the scale 44 of the measuring bar 40, is of the order of magnitude 2 m, it is required that the position of the spot of light from the deviated beam 36 on the scale 44 can be read off to within 1–2 mm, for an accurate comparison of the coaxiality of the wheel axes to be made. From a trial calculation it is immediately apparent, however, that the prism only needs to be disturbed one angular minute, i.e. $\gamma = 1'$, for this disturbance to cause the spot of light to move 1 mm on the scale 44. It is impossible in practice to retain such a nice adjustment of the prism 34 however, and measuring apparatus presently available, depending for their operation on a right-angularly deviated or reflected light beam, cannot be considered to meet the accuracy requirements which must be stipulated, e.g. in checking wheel axles.

According to the invention there is provided an optical assembly whose chief parts are in general agreement with what is shown in FIGS. 1 and 3, thus comprising a ray emitter, preferably a laser, mounted on a base extending from the emitter and carrying a double prism at its other end, which allows an incident beam to pass partially straight through the prism simultaneously as a portion of the incident beam is reflected laterally 90°. According to the invention, the double prism is supplemented with a compensating device making the prism insensitive to disturbances in its adjustment of the kind which has caused severe drawbacks in previous optical assemblies, such has been described in conjunction with FIG. 5.

The compensated double prism or prism unit according to the invention is denoted in its entirety by the numeral 50, see FIG. 6, and is composed of two semi-quadrangular prisms 52 and 54. Adjacent one side of the thus-formed double prism, denoted 55, there is a reflecting surface 56 arranged parallel to the prism surface, either in the form of a reflecting surface directly applied to it or preferably a separate mirror mounted adjacent the prism 55. In relation to the incident and departing rays, the prism 55 is turned, as shown in FIG. 6, so that an incident ray 58 will partly pass straight through the prism as a departing ray 60, and partly be reflected against the diagonal interface 53 between the semi-quadrangular prisms 52 and 54 to meet the mirror 56, mounted adjacent the outside of the prism. After being reflected by the mirror the ray passes straight through the prism as a reflected ray 62, which thus forms a right-angle to the incident ray 58.

The accordingly arranged double prism 55 with the mirror 56 have the properties, see FIGS. 7 and 8, that the departing reflected ray 62 does not alter its direction if the prism as a whole is disturbed or turned, as shown in FIG. 5. This is because the ray is reflected by the mirror 56 before departure. Independent of whether the prism 55 is turned in one or other direction (FIGS. 7 and 8, respectively) an incident ray 58 will first be reflected against the diagonal surface 53 as a short ray 59 or 59' meeting the mirror 56, to be reflected by it and then pass through the prism as the exitting deviated ray 62 normal to the incident ray 58. By using general optical laws, it can be easily shown that the ray construction shown in FIGS. 7 and 8 is correct, and that the reflected ray 62 will always form an exact right-angle to the incident ray 58, and thereby also to the completely refracted or through-passing ray 60.

A prerequisite for the above-mentioned exactly right-angular deviation or reflection of the ray 62 is naturally that the semi-quadrangular prisms 52 and 54 incorporated in the prism 55 are exactly ground, i.e. have accurately plane surfaces and exact corner angles 45-90-45°. Unfortunately most of the optical prisms available on the market are not sufficiently accurately made for the purpose of the invention, but the faults can easily be remedied by making the mirror 56 adjustable in relation to the adjacent surface of the prism 55. The mirror is thus arranged without direct engagement against the prism and slightly separated from it, as is exaggeratedly shown in the figures. With suitable (not shown) means the position of the mirror 56 is adjusted in relation to the prism 55 so that the reflection takes place in the desired way and that the reflected ray 62 forms an exact right angle with the incident ray 58.

FIG. 9 illustrates an alternative ray construction through the compensated prism unit 50, which may be utilized in the cases where a refracted outgoing ray coaxial with the incident ray is not required. As may be seen, an incident ray 64, somewhat inclined to the prism unit, will both pass through and be reflected by the diagonal surface 53 of the double prism 55, the reflected portion of the ray being screened off. The ray passing through the diagonal surface is reflected by the mirror 56 as an intermediate ray 65 which in turn is reflected by the diagonal surface 53 and leaves the prism as a departing ray 66 exactly normal to the incident ray 64, for the same reasons as previously set forth.

In FIG. 10 is shown a perspective view of a suitable embodiment of an optical assembly according to the invention, which is denoted in its entirety by the numeral 70. The assembly thus comprises a ray emitter 72, preferably a laser, and is provided with a suitable foot portion 74 having suitable guides for different measuring purposes, e.g. grooves or notches 76 with accurately machined surfaces for coaction with an axial pin such as pin 18 in FIG. 1, in general as previously described. The foot portion is suitably provided with clamps (not shown) with which the foot portion and thereby the whole assembly can be clamped on to the pin for pivoting about it under friction. The foot portion 74 is united with a base 78, carrying at its other end a deviating unit 80 including a prism unit 50 as illustrated in FIGS. 6-8, i.e. a double prism 55 united with a mirror 56. The deviating unit 80 comprises a housing 82 accommodating the prism unit 50, the housing being connected to a tubular shank 84 which is rotatably accommodated with a good fit in a cylindrical body or socket 86, which is united with the base 78 in a suitable way. A beam emitted from the emitter 72 and passing through the hollow shank 84 of the deviating unit 80 will partly pass directly through the unit and partly be reflected as a ray exactly right-angular to the incident ray, as described above, whereat possible errors in the alignment of the unit 80 on the base 78 will be without significance for the direction of the reflected ray. As has been mentioned, the deviating unit 80 with the housing 82 and the prism unit 50 is rotatable in the body 86, minor play between the shank 84 and the body having no significance either, and the outgoing beam can be turned round the incident beam, lying the whole time in a plane exactly normal to the incident beam. This ability, with the assembly according to the invention, of sweeping a beam deviated at exactly 90° to the incident/directly outgoing beam is of great practical importance. The base 78 is provided with a level 88 for horizontal adjustment, and furthermore the base has a scale 90 situated under the housing 82. By turning the housing so that the reflected beam impinges on the scale, the exact distance $y_1$ of this beam to the centre of the axle pin 18 can be read off.

The deviating unit 80 with its housing 82 and prism unit 50 is preferably easily removable from the base 78, e.g. by the shank 82 being withdrawable from the body 86. By doing this, a beam corresponding to the beam 30, 31 in FIG. 1 can be obtained, but now completely undisturbed. Such a beam is suitable when an exactly rectilinear beam is required along the frame, e.g. for carrying out an accurate frame check.

Using the optical assembly according to the invention is naturally not limited to checking and measuring wheel adjustment, frame geometry and the like, and the assembly also has other fields of use, e.g. checking buildings and the like. FIG. 11 illustrates the unique possibilities of the assembly 70 for measuring over larger distances, and where it is a question of checking up a right-angular system, e.g. in surveying and constructing buildings. According to FIG. 11 the assembly 70 has been placed on a firm foundation, whereafter the prism housing 82 with its cylindrical shank 84 has been removed from the body 86 and placed on a stand at a considerable distance from the ray emitter 72 of the assembly. If it is solely ensured that the beam therefrom enters the shank 84 and that the housing 82 is approximately aligned in the direction of the beam, a beam will depart from the housing which is at right-angles to the incident beam within half an angular minute.

I claim:

1. An optical assembly comprising a light source for emitting a collected concentrated light beam and an optical apparatus including (a) a beam splitter in the form of a quadrangular prism composed of two semi-quadrangular prisms having a semi-reflecting transparent region at their common interface, and (b) mirror means located spaced away from and facing one external face of the quadrangular prism;

said light source being oriented to direct said light beam toward said optical apparatus to be incident upon the quadrangular prism and to be split thereby into two part beams, one of which after reflection at said mirror means is an emergent light beam angularly deviated relative to said path of the incident beam;

the mirror meand having a position so adjusted relative to the quadrangular prism that said angular deviation is equal to 90° and is constant for a range of angles of incidence of said incident beam upon the quadrangular prism;

a base, said light source and optical assembly being mounted on said base, said optical apparatus being accommodated in a housing, said housing being a part of a deviating unit, said deviating unit being rotatably mounted in a body on said base of the optical assembly, the axis of rotation of the deviating unit substantially coinciding with said incident light beam from the light source.

2. An assembly as claimed in claim 1, wherein said base is provided with a scale impinged upon by said emergent light beam at a certain rotational position of the deviating unit.

3. An optical assembly as claimed in claim 1, wherein the deviating unit, incorporating the relatively positioned prism and mirror means, is removable from the rest of said optical assembly.

4. An optical assembly as claimed in claim 1, wherein said base is arranged for attachment to an elongate member, and is provided with guide means arranged to coact with said elongate member so that, in use, the light beam emitted by the light source will be aligned at right-angles to the direction of said elongate member.

5. An optical assembly as claimed in claim 4, wherein said base of the assembly is provided with attachment means, by which said base is removably secured to said elongate member and rotatable about it whilst maintaining said alignment.

6. An optical assembly for checking alignment of an axle with respect to a vehicle frame, comprising:

an elongate barlike base having means adjacent one end for mounting same with respect to one end of said axle for extension along said frame at right angles to said axle;

a light beam source fixed on said base adjacent said mounting means for directing a light beam along said base toward the free end of said base;

first measuring bar means securable transversely on said frame and having a scale spaced from said base and disposed along an extension of the length axis of said base;

second measuring bar means having means adjacent one end for mounting same with respect to the other end of said axle for extension along said frame at right angles to said axle and parallel to said base, and scale means adjacent the free end of said second measuring bar means;

an open ended tubular socket fixed on said elongate base adjacent the free end of said base and substantially coaxial with the path of a light beam from said source;

a housing from which extends a hollow tubular shank coaxial with and rotatably receivable in said socket for mounting said housing substantially coaxially along said light beam;

a quadrangular prism fixedly supported in said housing and comprising two triangular prisms having a semireflecting transparent region at their common interface, with opposed first and second sides of said two triangular prisms substantially on and facing along the longitudinal axis of said housing and the remaining opposed third and fourth sides of said two triangular prisms facing toward the sides of said housing substantially toward and away from, respectively, said scale on said second measuring bar means;

a mirror fixedly supported in said housing between the side of said housing and said fourth prism side and facing substantially toward said scale on said second measuring bar means, the prism being disposed on the path of a light beam from said light beam source, the prism and mirror providing two reflections for a light beam incident on said prism, namely at said interface and at said mirror, to provide an emergent beam angularly deviated from said incident beam and toward said second measuring bar means scale, said mirror being spaced from said quadrangular prism, the position of said mirror in said housing being so preadjusted as to render said angular deviation equal to 90° and a constant for a range of angles of incidence of said incident beam on said quadrangular prism, said housing being optically open toward said scales of said first and second measuring bar means as well as toward said light source, such that emergent light beams at 90° to each other are directed from said housing to the scales of said first and second measuring bar means with greater angular accuracy than required between the faces and interface of said quadrangular prism.

7. An optical assembly, usable as for checking alignment of an axle with respect to a vehicle frame, said optical assembly comprising:

an elongate base;

a light beam source fixed on said base adjacent one end of said base for directing a light beam along said base toward the other end of said base;

a body and means fixing said body with respect to said elongate base adjacent said other end of said base and having a portion substantially coaxial with said light beam from said source;

a housing rotatably supported by said body portion substantially coaxially along said light beam from said light source;

a quadrangular prism fixedly supported in said housing and comprising two triangular prisms having a semireflecting transparent region at their common interface, with opposed first and second sides of said two triangular prisms spaced from each other along and facing substantially along the longitudinal axis of said housing and the remaining opposed third and fourth sides of said two triangular prisms facing toward the sides of said housing;

a mirror member fixedly supported in said housing independent of said quadrangular prism, the quadrangular prism being disposed on the path of the light beam from said light beam source, the quadrangular prism and mirror providing two reflections for a light beam incident on said quadrangular prism, namely at said interface and at said mirror member, to provide an emergent beam angularly deviated from said incident beam and directed out the third prism side, said mirror being spaced from said quadrangular prism, the position of said mirror member in said housing being so preadjusted as to render said angular deviation equal to 90° and a constant for a range of angles of incidence of said incident beam on said quadrangular prism, said housing being optically open at said third prism side as well as toward said light source, such that light beams at 90° to each other enter and emerge from said housing with greater angular accuracy than required between the faces and interface of said quadrangular prism.

* * * * *